United States Patent Office 2,948,688
Patented Aug. 9, 1960

2,948,688

COMPOSITIONS COMPRISING 4-VINYLCYCLO-
HEXENE DIOXIDE

Howard L. Bender, Bloomfield, N.J., and Benjamin Phillips, Charleston, W. Va., assignors to Union Carbide Corporation, a corporation of New York No Drawing. Filed May 21, 1957, Ser. No. 660,488

17 Claims. (Cl. 260—2)

This invention relates to curable compositions comprising 4-vinylcyclohexene dioxide and a polyfunctional amine, and to the partially cured and cured compositions resulting therefrom.

Epoxide resins have been made heretofore from mixtures of amines and polyglycidyl ethers of polyhydric phenols. These resins have achieved a degree of usefulness in the synthetic resins art but are limited by certain inherent characteristics to a restricted field of application. The viscosities of these mixtures are so high (of the order of 9,000 centipoises and higher at 25° C. without solvents or diluents) as to preclude easy handling and application. For example, in making castings from these mixtures extreme care and many times special equipment are required in order to obtain bubble-free castings. Although diluents can be used, there are the disadvantages of higher cost and lower strength properties of resins made from these mixtures. The use of solvents is undesirable because of bubble formation in the resin when the solvent is driven off during curing and the dangers brought about by solvent fumes. It is also difficult to successfully incorporate fillers and pigments in these mixtures. Mixtures of amines and polyglycidyl ethers of polyhydric phenols have been found heretofore to have extremely short pot-lives. In some cases curing at room temperatures takes place before a homogeneous mixture of amine and polyglycidyl ether can be obtained. This is particularly disadvantageous in that the period of time permissible for working and applying the mixture is very short and in some cases negligible. Non-uniform resins are obtained in such cases because of the inability to form homogeneous amine-epoxide mixtures prior to curing. Such mixtures are additionally disadvantageous in that, even when their pot-lives are sufficiently long to permit the attainment of homogeneity, they cannot be maintained in workable form for long periods. This entails the necessity of maintaining the quantities of unmixed amine on hand which is accompanied by the dangers of the well-known toxicity and noxiousness associated with amines. The inconvenience of periodically preparing such amine-epoxide mixtures can be costly, time-consuming and dangerous.

The curable, polymerizable compositions of the instant invention comprise 4-vinylcyclohexene dioxide and a polyfunctional amine. By the term "polyfunctional amine," as used herein, is meant an amine having at least two active amino hydrogen atoms which can be on the same nitrogen or on different nitrogen atoms.

The polyfunctional amines contemplated include, among others, the aliphatic amines, aromatic amines, aralkyl amines, aliphatic polyamines, amino-substituted aliphatic carboxylic acids, amino-substituted phenols, amino-substituted aliphatic alcohols, low molecular weight polyamides, addition products of polyamines and low molecular weight epoxides containing oxirane oxygen linked to vicinal carbon atoms and others.

Accordingly, one or more of the following objects will be achieved by the practice of this invention.

It is an object of this invention to prepare novel curable compositions comprising 4-vinylcyclohexene dioxide and a polyfunctional amine, and to the partially cured and cured compositions resulting therefrom. It is another object of this invention to prepare novel curable compositions comprising 4-vinylcyclohexene dioxide and a polyfunctional amine which are mobile liquids having a viscosity in the range from about 25 to about 3,000 centipoises at room temperature. It is a further object of this invention to prepare novel curable and partially curable compositions comprising 4-vinylcyclohexene dioxide and a polyfunctional amine which, when dissolved in a suitable organic solvent, are useful in the fields of coatings, adhesives, molding, potting of electrical components, and the like. A still further object of this invention is directed to a novel process of reducing the gelation period of a curable composition comprising 4-vinylcyclohexene dioxide and a polyfunctional amine. A yet further object of this invention is to prepare novel intermediate reaction products resulting from the partial reaction of a composition comprising 4-vinylcyclohexene dioxide and a polyfunctional amine. Numerous other objects of the present invention will become apparent to those skilled in the art from a consideration of the instant specification.

Many of the curable compositions of this invention are mobile liquids possessing low viscosities from about 25 to about 900 centipoises at approximately 25° C. and are particularly capable of being easily prepared and conveniently applied to form bubble-free resins. Other curable compositions of this invention are solids which can be reduced to liquid form by heating without incurring substantial curing as long as heating is not prolonged for more than one to two hours. The curable compositions comprising 4-vinylcyclohexene dioxide and primary aliphatic amines can be stored at room temperature for periods ranging from 6 to 10 hours and longer, without appreciable hardening or increase in viscosity. Those curable compositions comprising 4-vinylcyclohexene dioxide and a secondary aliphatic polyamine or aromatic amine, i.e., an amine having at least two active amino hydrogen atoms, which can be on the same or different nitrogen atoms, can be stored for periods ranging from about one day to one week, or longer, without appreciable hardening or increase in viscosity. The curable compositions comprising, for example, 4-vinylcyclohexene dioxide and a secondary aliphatic polyamine or aromatic polyamine, can be partially cured to form solid, partially polymerized resins which can be pulverized or ground to make molding to casting compounds. Such molding or casting compounds can be stored without refrigeration for long periods of time, e.g., up to a year and longer, and subsequently be molded or otherwise shaped and fully cured by the application of heat.

In addition, the partially cured resins can be dissolved in a suitable organic solvent such as xylene, methyl isobutyl ketone, butyl acetate, butanol, ethyl acetate and the like. The compositions dissolved in these exemplified solvents can be used as, for example, surface coating which can be subsequently heat cured to hard, tough, scratch-resistant coatings.

The proportion of partially cured resin to solvent will depend on various factors such as the particular mixture being cured, the degree or extent of the partial cure, the particular organic solvent employed and other considerations. In general, a solution comprising from about 10 to about 90 weight percent of partially cured resin, based on the total weight of partially cured resin and solvent, is suitable; from about 40 to 70 weight percent of partially cured resin, based on the total weight of partially cured resin and solvent, is preferred. Moreover, the uncured compositions can be dissolved in solvents of the type exemplified above and applied to surfaces and subsequently heat cured to form hard, tough coatings. Should the solution comprising the uncured composition tend to "run" when applied to the surface, a conventional wetting agent and/or thixotropic agent can be added to the solution mixture to insure a more uniform coating on the surface.

The curing of the novel curable compositions of this invention can be facilitated, when desired, by incorporating therein small amounts of catalysts, hereinafter described, or by the application of heat without catalysts or by both measures. It has been observed that the pot-life of the novel curable systems of this invention are better than the commercial epoxide-containing systems, e.g., diglycidyl ethers of polyhydric phenols and polyamine systems.

The curable compositions of this invention can be readily prepared by mixing a polyfunctional amine, i.e., an amine having at least two active amino hydrogen atoms on the same nitrogen atom or different nitrogen atoms, with 4-vinylcyclohexene dioxide. It is preferred to agitate the curable composition, for example, by stirring or other suitable means, so as to obtain a homogeneous mixture or solution. When a solid or highly viscous amine is employed heating is advantageous in facilitating the formation of a solution. In any event the application of heat should not be prolonged to the extent that appreciable curing takes place. Catalysts can be added at this point or at any other point prior to curing or not at all, as desired.

The curable compositions of this invention can be heated to a temperature in the range from about 20° C. to about 250° C., preferably from about 25° C. to about 200° C., for a period of time sufficient to produce hard, infusible resin products. Temperatures higher than 250° C. can be used although some discoloration which may not be desired may be brought about in the resins thus formed. The time for effecting the complete cure will be governed, to an extent, on several factors such as the particular polyamine component employed, the proportions of 4-vinylcyclohexene dioxide and polyamine used, the temperature for effecting the cure, the use or omission of a catalyst in the system, and other considerations. In general, the time for effecting the complete cure can be made to vary from several minutes to several days, e.g., ten days, depending upon the correlation of such factors as noted above.

A higher curing temperature will provide a resin in less time than a low curing temperature. One preferable method is to heat the curable compositions to a temperature within the range from 25° C. to 150° C. to first partially cure the composition. A temperature from 100° C. to 200° C. then can be used to complete the cure. However, any one or combination of two or more temperatures within the specified range of 20° C. to 250° C. can be employed, if desired, to effect the full cure.

While not wishing to be held to any particular theory or mechanics of reaction, it is believed that in curing, one epoxy group of the diepoxide molecule reacts with a maximum of one amino hydrogen of the polyfunctional amine molecule with the formation of a hydroxyl group attached to the diepoxide molecule and a carbon to nitrogen to carbon linkage interconnecting the amine and diepoxide molecules. Thus, according to this belief, a polyfunctional amine having more than 2 amino hydrogens to the molecule would cross-link through carbon to nitrogen to carbon linkages. Also, according to our observations a degree of etherification occurs from intermolecular reactions of two or more epoxy groups with each other and from intermolecular reactions of any epoxy group with a hydroxyl group formed in the above-noted manner by a previous reaction of an epoxy group with an amino hydrogen. Thus, additional cross-linking through carbon to oxygen to carbon linkages is thought to be effected by these intermolecular reactions between epoxy groups or epoxy groups and hydroxyl groups.

Hard, solid resins have been obtained by curing the curable compositions of this invention which contain such relative proportions of polyfunctional amine and 4-vinylcyclohexene dioxide as provide from about 0.3 to 4.0 amino hydrogen atoms of the amine for each epoxy group from the diepoxide. Hard, tough, infusible resins have been obtained from the curable compositions containing such relative amounts of polyfunctional amine and 4-vinylcyclohexene dioxide as provide from about 0.5 to 2.0 amino hydrogen atoms of the amine for each epoxy group of the diepoxide. Resins produced from the curable compositions containing from about 1.0 to 3.0 amino hydrogen atoms per epoxy group have potential use as anion exchange resins. Hardenable epoxide resins can be obtained from the curable compositions, for example, which contain less than 0.3 amino hydrogen atom per epoxy groups. Such hardenable resins can be polymerized with active hydrogen compounds, e.g., polyamines, polyhydric phenols, polycarboxylic acids and the like, or polycarboxylic acid anhydrides, to form useful products, or they can be used as plasticizers and/or stabilizers for chlorine-containing resins. Epoxide resin hardeners can also be made from the curable compositions, particularly those containing more than 4.0 amino hydrogen atoms per epoxy group. These resin hardeners can be used to harden the many polyepoxides to produce useful products. Resins having different physical properties can be produced by curing the compositions of this invention which contain varying ratios of amino hydrogens to epoxy groups. Resins having better light resistant properties are obtained for instance, if the epoxy groups are in excess over the active amino hydrogen atoms.

The diepoxide, i.e., 4-vinylcyclohexene dioxide, can be prepared by treatment of vinylcyclohexene with an excess of peracetic acid solution in an inert solvent such as acetone or ethyl acetate at approximately 70° C., followed by isolation of the diepoxide product by fractional distillation. The dioxide can also be prepared by treating vinylcyclohexene monoxide with peracetic acid under approximately the same conditions. Other modes of preparing 4-vinylcyclohexene dioxide are more fully described in United States Patent No. 2,539,341.

Various polyfunctional amines containing at least two active amino hydrogen atoms are useful in preparing the curable, partially cured, and cured compositions of this invention. Among the polyfunctional amines contemplated, providing that said amines contain at least two active amino hydrogen atoms which can be on the same nitrogen atom or different nitrogen atoms, include the aliphatic amines, aromatic amines, aralkyl amines, cycloaliphatic amines, alkaryl amines, aliphatic polyamines including polyalkylene polyamines, amino-substituted aliphatic carboxylic acids, amino-substituted aliphatic alcohols, amides, polyamides, addition products of polyamines and low molecular weight epoxides containing oxirane oxygen linked to vicinal carbon atoms, and so forth.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, mesidine, benzylamine, phenethylamine, 1-naphthylamine, m-, o-, and p-phenylenediamines, 1,4 - naphthalenediamine, 3,4-toluenediamine, and the like.

Illustrative cycloaliphatic amines include cyclopentylamine, cyclohexylamine, p-menthane-1,8-diamine, and others.

Among the amino-substituted aliphatic carboxylic acids can be listed glycine, beta-alanine, valine, gamma-aminobutyric acid, and the like. Typical amides, particularly monoaliphatic amides, include acetamide, propionamide, butyramide, valeramide, and the like. The amides are only mildly reactive, and it is preferred to employ these amides in combination with the more conventional active hardeners. The polyamides, i.e., those having an average molecular weight range from about 300 to about 10,000 include condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamines, propylenediamine, butylenediamine, and the like.

The aliphatic polyamines contemplated in the present invention include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylenepentamine, dipropylenetriamine, and the like are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenol, 4-aminophenol, 2,3-xylenol, and the like.

Other illustrations of polyfunctional amines are the addition products of polyamines, in particular, diamines and triamines and low molecular weight epoxides containing oxirane oxygen linked to vicinal carbon atoms, such as ethylene oxide, propylene oxide, butadiene dioxide, diglycidyl ether, epoxidized soybean oil, epoxidized soflower oil, and polyglycidyl ethers, such as those prepared from polyhydric phenols and epichlorohydrin. Particularly useful polyfunctional amines are the monohydroxyalkyl polyalkylene polyamines which can be prepared by the addition reaction of polyalkylene polyamines preferably, ethylenediamine, propylenediamine, diethylenetriamine, dipropylenetriamine, triethylenetetramine, and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylenediamine,
N-hydroxypropyldiethylenetriamine,
N,N-bis(hydroxypropyl)diethylenetriamine,
N,N''-bis(hydroxypropyl)diethylenetriamine,
N-hydroxyethylpropylenediamine,
N-hydroxyethyldipropylenetriamine, and the like. Other polyfunctional amines can be prepared from known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols such as for example, the homologues of dihydroxydiphenylmethanes singularly or mixed and the dihydroxydiphenyldimethylmethanes singularly or mixed. Mixtures of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl polyether of a dihydric phenol with a polyalkylene diamine such as diethylenetriamine, dipropylene triamine, and the like, bringing to an elevated temperature for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, e.g., from about three to four hours, while maintaining the reaction mixture at an elevated temperature, for example, up to about 200° C. and subsequently adding a dihydric phenol.

Examples of still other polyfunctional amines suitably adaptable for use in the present invention include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, 2,4,6-triaminopyrimidine, and the like; dimethylurea, guanidine, p,p' - sulfonyldiamine, 3,9 - bis(aminoethyl) spirobimetadioxane, hexahydrobenzamide, and others.

Other polyfunctional amines having a total of at least two active amino hydrogen atoms to the molecule can be advantageously employed in the epoxide compositions of this invention. For example, such polyfunctional amines as mixtures of p,p'-methylenedianiline and m-phenylenediamine, or other mixtures of two or more polyfunctional amines can be used.

Catalysts which can be employed in our curable compositions to increase the curing rate and/or reduce the gelation period are the metal halide Lewis acids, e.g., boron trifluoride, stannic chloride, zinc chloride, ferric chloride, aluminum chloride, and the like; metal halide Lewis acid-amine complexes, e.g., piperidine-boron trifluoride complex, boron trifluoride-1,6-hexanediamine complex, monethylamine-moron trifluoride complex, and the like; metal halide Lewis acid-ether complexes, e.g., boron trifluoride-dimethyl ether complex, boron trifluoride-diethyl ether complex, and the like; polyols, i.e., saturated aliphatic and cycloaliphatic alcohols, and the phenols, etc., e.g., propanol, decanol, diethylene glycol, dipropylene glycol, glycerine, castor oil, cyclopentanol, cyclohexanol, phenol, cresol, resorcinol, catechol, pyrogallol, naphthol, and the like.

Uniform dispersions of catalyst in the curable compositions prior to curing have been found to be desirable in order to minimize local curing around catalyst particles. Agitation of the curable compositions as the catalyst is added is sufficient when the catalyst is miscible with the composition. When the two are immiscible, the catalyst can be added in an organic solvent. Typical solvents for the acid catalysts include organic ethers, e.g., diethyl ether, dipropyl ether; organic esters, e.g., methyl acetate, ethyl propionate; organic ketones, e.g. acetone, cyclohexanone; organic alcohols, e.g., methanol, propylene glycol and the like. The catalyst is employed in catalytic quantities, and in general, catalyst concentrations up to 15.0 weight percent, and higher, based on the weight of the diepoxide, have been found to be advantageous. Catalyst concentrations as low as 0.05 weight percent and lower, based on the weight of diepoxide, have been found to provide appreciable catalytic effect.

In the following illustrative examples, Barcol hardness values were determined by the use of a Barcol Impressor GYZJ-934-1 at a temperature of 25° C.; heat distortion point values were ascertained in accordance with ASTM method D-256-47T. Unless otherwise indicated, the examination or description of the resins were conducted at room temperature, i.e., 25°–26° C.

EXAMPLE I

A mixture was prepared from 11.4 grams of 4-vinylcyclohexene dioxide and 10.0 grams of diethylenetriamine. The resulting mixture was allowed to stand at room temperature, i.e., approximately 25° C., for four hours. No viscosity or temperature change was observed in the mixture during this period; thus the said mixture did not cure under these conditions as does a mixture using the same weight of diglycidyl ether of 2,2-bis(4-hydroxyphenol)-propane. The 4-vinylcyclohexene dioxide-diethylenetriamine mixture was cast into a glass test tube and placed in an 80° C. oven for 8 hours. The product removed from the glass tube was hard, infusible and solvent resistant to acetone, methyl alcohol and chloroform.

EXAMPLE II

An addition product of 1 mole of 4-vinylcyclohexene dioxides and 4 moles of diethylenetriamine was prepared by heating the resulting mixture for 8 hours at 80° C. A mixture containing 10.0 grams of the above addition product and 16.4 grams of 4-vinylcyclohexene dioxide was subsequently prepared. This 4-vinylcyclohexene dioxide-addition product system was a low viscosity liquid which did not change on standing for long periods of time at room temperature. Upon pouring into a glass test tube and heating for 8.0 hours at 80° C., there was obtained a hard, bubble-free casting which was infusible and acetone-insoluble.

EXAMPLE III

A mixture was prepared from 5.4 grams of 4-vinylcyclohexene dioxide and 1.5 grams of ethylenediamine. The resulting mixture contained amounts of diepoxide and amine so as to provide 1.3 amino hydrogen atoms per epoxy group. This clear, mobile liquid mixture evaporated at 160° C. before gelling. On standing a room temperature, i.e., 25° C., for 30 hours, the mixture showed only a slight increase in viscosity. Subsequently increasing the temperature to 160° C. for 5 minutes produced gelation. The resulting resin was brittle and soluble in acetone. After baking overnight at 160° C., the resin was insoluble in acetone and thermoset.

EXAMPLE IV

A mixture was prepared from 5.4 grams of 4-vinylcyclohexene dioxide and 1.5 grams of ethylenediamine. This mixture formed a viscous resin after 54 hours at 25° C. The resulting material was cast at 110° C. for 20 hours. A clear, yellow, bubble free, acetone insoluble thermoset resin which was brittle on attempting to carve with a knife, was obtained.

EXAMPLE V

A mixture was prepared from 5.4 grams of 4-vinylcyclohexene dioxide and 1.5 grams of ethylenediamine which on mixing in an insulated air space at 27° C. showed only an 0.6° C. rise in temperature. After 1½ hours, the temperature increase had disappeared, and the mixture was placed in an oven at 60° C. Gelation did not occur while holding this mixture at 60° C. for 4½ hours. Maintaining the temperature at 60° C. for an additional 14½ hours gave a light yellow, clear, hard, brittle, acetone insoluble, thermoset resin.

EXAMPLES VI–XII

Seven mixtures of varying proportions of 4-vinylcyclohexene dioxide and the addition product of 4 moles of diethylenetriamine with 1 mole of diglycidyl ether of 2,2-bis(4-hydroxyphenol)propane were prepared. These mixtures were heated to 80° C. at which temperature gelation occurred at the times indicated in Table I. The temperature was subsequently raised to effect a post cure for 6 hours at 160° C. The results are set out in Table I below:

Table I

| Example Number | Diepoxide (grams) | Addition Product (grams) | Amino Hydrogen Per Epoxy Group | Gel Time at 80° C. | Total Cure (Hours and ° C.) | Description at 26° C. |
|---|---|---|---|---|---|---|
| 6 | 1.70 | 0.3 | 0.25 | No gel | 15 hrs. at 80°; 6 hrs. at 160°. | Firm. |
| 7 | 1.60 | 0.4 | 0.35 | No gel | 15 hrs. at 80°; 6 hrs. at 160°. | Hard, Brittle. |
| 8 | 1.50 | 0.5 | 0.47 | 40 min | 7 hrs. at 80°; 6 hrs. at 160°. | Hard, Brittle. |
| 9 | 1.40 | 0.6 | 0.60 | 24 min | 7 hrs. at 80°; 6 hrs. at 160°. | Hard, Brittle. |
| 10 | 1.30 | 0.7 | 0.75 | 13 min | 7 hrs. at 80°; 6 hrs. at 160°. | Tough, Barcol hardness of 40. |
| 11 | 1.20 | 0.8 | 0.94 | 10 min | 7 hrs. at 80°; 6 hrs. at 160°. | Tough, Barcol hardness of 46. |
| 12 | 4.40 | 3.6 | 1.15 | | 1 hr. at 80°; 6 hrs. at 160°. | Tough, Barcol hardness of 54. |

EXAMPLES XIII–XXIV

Twelve mixtures, each containing 0.7 gram of 4-vinylcyclohexene dioxide and various proportions of diethylenetriamine as listed in Table II below, were prepared. These mixtures were heated to 80° C. for a period from about 2.5 to 6.5 hours; gelation occurred where indicated in Table II.

The temperature was subsequently raised to effect a post cure at 120° C. or 160° C. The results are set out in Table II below:

Table II

| Example Number | Diethylene-triamine (grams) | Amino Hydrogen per Epoxy Group | Gel time and Temperature (hours and °C.) | Total Cure (Hours and °C.) | Description at Room Temperature |
|---|---|---|---|---|---|
| 13 | 0.043 | 0.2 | No gel after 6.5 hrs. at 80°; 28 hrs. at 120° | 6.5 hrs. at 80°; 28 hrs. at 120°. | amber, viscous liquid. |
| 14 | 0.065 | 0.3 | No gel after 6.5 hrs. at 80°; 28 hrs. at 120°. | 6.5 hrs. at 80°; 28 hrs. at 120°. | amber, firm. |
| 15 | 0.086 | 0.4 | 6.5 hrs. at 80°; 8 hrs. at 120°. | 6.5 hrs. at 80°; 28 hrs. at 120°. | amber, hard. |
| 16 | 0.108 | 0.5 | 6.5 hrs. at 80°; 8 hrs. at 120°. | 6.5 hrs. at 80°; 28 hrs. at 120°. | yellow, tough, Barcol hardness of 45. |
| 17 | 0.216 | 1.0 | 1 hr. at 80°. | 6.5 hrs. at 80°; 6 hrs. at 160°. | amber, tough, Barcol hardness of 50. |
| 18 | 0.26 | 1.25 | 0.5 hr. at 80°. | 6.5 hrs. at 80°; 6 hrs. at 160°. | yellow, tough Barcol hardness of 50. |
| 19 | 0.324 | 1.5 | 0.5 hr. at 80°. | 6.5 hrs. at 80°; 6 hrs. at 160°. | yellow, hard. |
| 20 | 0.43 | 2.0 | 0.5 hr. at 80°. | 6.5 hrs. at 80°; 6 hrs. at 160°. | yellow, hard. |
| 21 | 0.54 | 2.5 | 0.5 hr. at 80°. | 6.5 hrs. at 80°; 6 hrs. at 160°. | yellow, hard. |
| 22 | 0.65 | 3.0 | 0.67 hr. at 80°. | 6.5 hrs. at 80°; 6 hrs. at 160°. | yellow, hard. |
| 23 | 0.76 | 3.5 | 0.73 hr. at 80°. | 6.5 hrs. at 80°; 6 hrs. at 160°. | yellow, hard. |
| 24 | 0.86 | 4.0 | No gel after 6.5 hrs. at 80° C.; 28 hrs. at 120°. | 6.5 hrs. at 80°; 28 hrs. at 120°. | amber, firm. |

EXAMPLE XXV 4-vinylcyclohexene dioxide (0.7 gram) and p,p'-methylenedianiline (0.62 gram) were mixed in a glass tube in the proportions of 1.25 amino hydrogens per 1.0 epoxy group. The resulting mixture was heated until homogeneous at a temperature range from about 50° C. to 60° C. and then maintained at 120° C. for 5.5 hours. A gel time at 120° C. of 1.5 hours was observed. After a post cure of 6 hours at 160° C. there was obtained an amber-colored, brittle resin with a Barcol hardness of 50.

EXAMPLE XXVI

A mixture was prepared from 7.0 grams of 4-vinylcyclohexene dioxide and 3.8 grams of an addition product consisting of 1 part by weight of diethylenetriamine, 1 part by weight of 2,2-bis(4-hydroxyphenyl)propane, and 2 parts by weight of the addition product described in Examples VI–XII. The resulting mixture contained 0.8 amino hydrogen per one epoxy group. This mixture was allowed to remain at room temperature, i.e., approximately 26° C., for 94 hours with gelation occurring between 6 and 20 hours. The resulting gel was then cured for 1 hour at 50° C., 5 hours at 80° C., 2 hours at 120° C. and 6 hours at 160° C. A pale amber-colored, tough resin having a Barcol hardness of 52 was obtained.

EXAMPLES XXVII–XXXIII

Eight mixtures, each containing 0.7 gram of 4-vinylcyclohexene dioxide admixed with different polyfunctional amines in the proportion of one amino hydrogen per one epoxy group, were prepared. These mixtures were heated to 80° C. at which temperature gelation occurred where indicated in Table III. Post cures were subsequently effected. The results are set out in Table III below:

Table III

| Example Number | Amine | Grams | Gel Time at 80° C. | Total Cure (Hours and °C.) | Description at Room Temperature |
|---|---|---|---|---|---|
| 27 | ethylenediamine. | 0.15 | 16 minutes. | 8 hrs. at 80°; 6 hrs. at 160°. | pale, amber, hard. |
| 28 | 1,6-hexanediamine. | 0.29 | 18 minutes. | 8 hrs. at 80°; 6 hrs. at 160°. | pale, amber, hard. |
| 29 | diethylenetriamine. | 0.22 | 48 minutes. | 8 hrs. at 80°; 6 hrs. at 160°. | pale amber, Barcol hardness of 50. |
| 30 | xylylenediamine. | 0.34 | 94 minutes. | 8 hrs. at 80°; 6 hrs. at 160°. | pale yellow, hard. |
| 31 | p-phenylenediamine. | 0.27 | 240 minutes. | 8 hrs. at 80°; 6 hrs. at 160°. | black, hard. |
| 32 | aniline. | 0.47 | No gel after 14 hrs. at 80° plus 8 hrs. at 120°. | 14 hrs. at 80°; 8 hrs. at 120°. | amber, hard. |
| 33 | Polyamide 115 [1] | 1.82 | No gel after 14 hrs. at 80° plus 1.25 hrs. at 120°. | 4 hrs. at 80°; 2.5 hrs. at 120°; 6 hrs. at 160°. | pale amber, tough Barcol hardness of 0. |

[1] Liquid condensation product of a polymerized unsaturated fatty acid and an aliphatic amine.

EXAMPLES XXXIV–XXXVII

Four mixtures, each containing 0.7 gram of 4-vinylcyclohexene dioxide and 0.5 gram of p,p'-methylenedianiline in the proportion of one amino hydrogen per one epoxy group, were prepared. Various catalysts were then added to three of the above mixtures. These mixtures were subsequently heated to 120° C. and the time required to produce gelation was recorded. The results are set out in Table IV below:

Table IV

| Example Number | Catalyst | Weight (grams) | Percent (by Wt.) [1] | Gel Times at 120° (minutes) |
| --- | --- | --- | --- | --- |
| 34 | none | | | 90 |
| 35 | 2,2-bis(4-hydroxyphenyl)propane | 0.1 | 14.3 | 20 |
| 36 | ethylene glycol | 0.1 | 14.3 | 45 |
| 37 | boron trifluoride-piperidine complex | 0.05 | 7.2 | 20 |

[1] Percent by weight based on the weight of the diepoxide.

It is apparent that markedly reduced gel times are obtained with catalyst-containing systems.

EXAMPLES XXXVIII–XL

Three mixtures of varying proportions of 4-vinylcyclohexene dioxide and the addition product of 4 moles of diethylenetriamine with 1 mole of diglycidyl ether of 2,2-bis(4-hydroxyphenyl)propane were prepared and allowed to stand at room temperature for 48 hours during which time gelation occurred. The gels were subsequently cured for 2 hours at 50° C.; 2 hours at 80° C.; 3.5 hours at 100° C.; 24 hours at 120° C. and 6 hours at 160° C. The resulting resins had the physical properties indicated in Table V below:

Table V

| Example Number | Diepoxide (grams) | Addition Product (grams) | Amino Hydrogen Per Epoxy Group | Heat Distortion Point, ° C. | Barcol Hardness |
| --- | --- | --- | --- | --- | --- |
| 38 | 22.3 | 12.7 | 0.8 | 117° | 60 |
| 39 | 20.4 | 14.6 | 1.0 | 116° | 62 |
| 40 | 18.7 | 16.3 | 1.2 | 104° | 61 |

It is pointed out that the markedly high Barcol hardness values above indicate resins possessing extreme hardness useful in the preparation of, for example, laminates which are highly scratch-resistant. In general, conventional epoxy resins such as diglycidyl ether of 2,2-bis(4-hydroxyphenyl)propane and polyfunctional amines of the type employed in these examples possess Barcol hardness values in the range from about 30 to 40.

EXAMPLE XLI

Molten 4,4'-methylenedianiline (100 parts by weight) was added to 4-vinylcyclohexene dioxide (73.5 parts by weight) at room temperature. Subsequently, this mixture was heated for 15 hours at 80 C., 6 hours at 160° C., and 1 hour at 200° C., and cast. The resulting resin had the physical properties indicated in Table VI below:

Table VI

| | |
| --- | --- |
| Heat distortion, ° C. | 179 |
| Rockwell hardness | M127 |
| Compressive strength, p.s.i. | 29,600 |
| Compressive yield, p.s.i. | 19,200 |
| Flexural strength, p.s.i. | 8,300 |
| Flexural modulus×10⁻⁶ | 0.33 |
| Flexural tangent @ P.L. | 8,300 |
| Flexural strength @ 175° C. | 2,600 |

It is significant to note the high heat distortion value, i.e., 179° C., which the resin possesses, which value is much higher than conventional resins.

Various modifications and embodiments of the instant invention can be made without departing from the spirit and scope thereof.

What is claimed is:

1. A curable composition comprising 4-vinylcyclohexene dioxide and an organic polyfunctional amine which contains at least two amino hydrogen atoms, said composition containing from about 0.3 to 4.0 amino hydrogen atoms of said polyfunctional amine for each epoxy group of said 4-vinylcyclohexene dioxide.

2. Thermosetting intermediate reaction products resulting from the partial reaction of the curable composition claimed in claim 1.

3. A resin obtained by the reaction of the curable composition claimed in claim 1.

4. A curable composition comprising 4-vinylcyclohexene dioxide and a polyfunctional aliphatic amine which contains at least two amino hydrogen atoms, said composition containing from about 0.3 to 4.0 amino hydrogen atoms of said aliphatic amine for each epoxy group of said 4-vinylcyclohexene dioxide.

5. A resin obtained by the reaction of the curable composition claimed in claim 4.

6. A curable composition comprising 4-vinylcyclohexene dioxide and a polyfunctional aromatic amine which contains at least two amino hydrogen atoms, said composition containing from 0.3 to 4.0 amino hydrogen atoms of said aromatic amine for each epoxy group of said 4-vinylcyclohexene dioxide.

7. A resin obtained by the reaction of the curable composition claimed in claim 6.

8. A curable composition comprising 4-vinylcyclohexene dioxide and a polyfunctional aliphatic polyamine compound which contains at least two amino hydrogen atoms, said composition containing from about 0.3 to 4.0 amino hydrogen atoms of said polyamine compound for each epoxy group of said 4-vinylcyclohexene dioxide.

9. A resin obtained by the reaction of the curable composition claimed in claim 8.

10. A curable composition comprising 4-vinylcyclohexene dioxide and an addition product of a polyfunctional polyalkylene polyamine with a low molecular weight epoxide containing oxirane oxygen linked to vicinal carbon atoms, said addition product containing at least two amino hydrogen atoms, said composition containing from about 0.3 to 4.0 amino hydrogen atoms of said addition product for each epoxy group of said 4-vinylcyclohexene dioxide.

11. A resin obtained by the reaction of the curable composition claimed in claim 10.

12. A curable composition comprising 4-vinylcyclohexene dioxide and diethylenetriamine, said composition containing from about 0.3 to 4.0 amino hydrogen atoms of said diethylenetriamine for each epoxy group of said 4-vinylcyclohexene dioxide.

13. A resin obtained by the reaction of the curable composition claimed in claim 12.

14. A curable composition comprising 4-vinylcyclohexene dioxide and the addition product of diethylenetriamine with diglycidyl ether of 2,2-bis(4-hydroxyphenyl)propane, said composition containing from about 0.3 to 4.0 amino hydrogen atoms of said addition product for each epoxy group of said 4-vinylcyclohexene dioxide.

15. A resin obtained by the reaction of the curable composition claimed in claim 14.

16. A curable composition comprising 4-vinylcyclohexene dioxide and methylenedianiline, said composition containing from about 0.3 to 4.0 amino hydrogen atoms of said methylenedianiline for each epoxy group of said 4-vinylcyclohexene dioxide.

17. A resin obtained by the reaction of the curable composition claimed in claim 16.

References Cited in the file of this patent

UNITED STATES PATENTS

| | | |
|---|---|---|
| 2,136,928 | Schlack | Nov. 15, 1938 |
| 2,444,333 | Castan | June 29, 1948 |
| 2,527,806 | Foster | Oct. 31, 1950 |
| 2,585,115 | Greenlee | Feb. 12, 1952 |
| 2,705,223 | Wittcaff | Mar. 29, 1955 |

OTHER REFERENCES

Schrade et al.: Kunststoffe, vol. 43, 1953, pages 266–270.